(12) United States Patent
McCullough et al.

(10) Patent No.: US 6,913,838 B2
(45) Date of Patent: Jul. 5, 2005

(54) ALUMINUM MATRIX COMPOSITE WIRE

(75) Inventors: Colin McCullough, Minneapolis, MN (US); Doug E. Johnson, Minneapolis, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 10/730,182

(22) Filed: Dec. 8, 2003

(65) Prior Publication Data

US 2004/0112565 A1 Jun. 17, 2004

Related U.S. Application Data

(63) Continuation of application No. 09/616,741, filed on Jul. 14, 2000, now Pat. No. 6,723,451.

(51) Int. Cl.⁷ .................. B32B 15/20; B32B 15/14; B21C 37/04; B21F 21/00
(52) U.S. Cl. ................... 428/614; 428/539.5; 428/611; 428/629; 428/650
(58) Field of Search ............................. 428/614, 539.5, 428/611, 629, 650

(56) References Cited

U.S. PATENT DOCUMENTS

| | | |
|---|---|---|
| 2,883,314 A | 4/1959 | Martin |
| 3,098,723 A | 7/1963 | Micks |
| 3,294,604 A | 12/1966 | Feick, III |
| 3,547,180 A | 12/1970 | Cochran et al. |
| 3,631,519 A | 12/1971 | Hooshang |
| 3,795,524 A | 3/1974 | Sowman |
| 3,808,015 A | 4/1974 | Seufert |
| 3,813,481 A | 5/1974 | Adams |
| 4,012,204 A | 3/1977 | Riewald et al. |
| 4,047,965 A | 9/1977 | Karst et al. |
| 4,053,011 A | 10/1977 | Riewald et al. |
| 4,152,149 A | 5/1979 | Horikiri et al. |
| 4,341,823 A | 7/1982 | Sexton et al. |
| 4,450,207 A | 5/1984 | Donomoto et al. |

(Continued)

FOREIGN PATENT DOCUMENTS

| | | |
|---|---|---|
| DE | 3822543 A1 | 1/1990 |
| EP | 0 461 871 A2 | 12/1991 |
| JP | 52-36274 | 9/1977 |
| JP | 3-129606 | 9/1989 |
| JP | 2-155129 | 6/1990 |
| JP | 3-71509 | 3/1991 |
| JP | 3-101004 | 4/1991 |
| JP | 3-101011 | 4/1991 |
| JP | 5-290632 | 4/1992 |
| JP | 4-44366 | 7/1992 |
| JP | 7-13056 | 1/1995 |
| JP | 7-105761 | 4/1995 |
| JP | 10-21758 | 1/1998 |
| WO | WO 97/00976 | 1/1997 |

OTHER PUBLICATIONS

3M Product Brochure, "Continuous Ceramic Fiber Aluminum Matrix Composites," 3M Metal Matrix Composite Project, St. Paul, Minnesota, date unknown but belived to be prior to filing of the priority application, 6 pages.

ASTM B 230/B 230M—99, "Standard Specification for Aluminum 1350–H19 Wire for Electrical Purposes," *Annual Book of ASTM Standards*, vol. 02.03, (1999), pp. 100–104.

ASTM D 3379–75, "Standard Test Method for Tensile Strength and Young's Modulus for High–Modulus Single–Filament Materials," *Annual Book of ASTM Standards*, vol. 08.01, (1989), pp. 128–131.

(Continued)

*Primary Examiner*—Deborah Jones
*Assistant Examiner*—Jason L Savage
(74) *Attorney, Agent, or Firm*—Gregory D. Allen

(57) ABSTRACT

Aluminum matrix composite wire comprising ceramic fibers with a matrix of aluminum.

9 Claims, 8 Drawing Sheets

U.S. PATENT DOCUMENTS

| | | |
|---|---|---|
| 4,544,610 A | 10/1985 | Okamoto et al. |
| 4,590,132 A | 5/1986 | Dohnomoto et al. |
| 4,631,793 A | 12/1986 | Shintaku et al. |
| 4,649,060 A | 3/1987 | Ishikawa et al. |
| 4,751,269 A | 6/1988 | Bonk et al. |
| 4,757,790 A | 7/1988 | Ushio et al. |
| 4,779,563 A | 10/1988 | Ishikawa et al. |
| 4,818,633 A | 4/1989 | Dinwoodie et al. |
| 4,831,707 A | 5/1989 | Goddard et al. |
| 4,835,340 A | 5/1989 | Muz |
| 4,839,238 A | 6/1989 | Nakatani et al. |
| 4,877,643 A | 10/1989 | Ishikawa et al. |
| 4,929,513 A | 5/1990 | Kyono et al. |
| 4,954,462 A | 9/1990 | Wood et al. |
| 4,956,523 A | 9/1990 | Pawluk |
| 4,961,990 A | 10/1990 | Yamada et al. |
| 5,002,836 A | 3/1991 | Dinwoodie et al. |
| 5,126,167 A | 6/1992 | Matsuno et al. |
| 5,170,015 A | 12/1992 | Kudo et al. |
| 5,171,942 A | 12/1992 | Powers |
| 5,185,299 A | 2/1993 | Wood et al. |
| 5,435,374 A | 7/1995 | Fishkis et al. |
| 5,464,949 A | 11/1995 | Markovitz et al. |
| 5,501,906 A | 3/1996 | Deve |
| 5,518,597 A | 5/1996 | Storer et al. |
| 5,549,770 A | 8/1996 | Larker et al. |
| 5,554,826 A | 9/1996 | Gentry |
| 5,571,296 A | 11/1996 | Barber, Jr. et al. |
| 6,022,914 A | 2/2000 | Nowak et al. |
| 6,078,010 A | 6/2000 | Funahashi et al. |
| 6,180,232 B1 | 1/2001 | McCullough et al. |
| 6,245,425 B1 | 6/2001 | McCullough et al. |
| 6,329,056 B1 | 12/2001 | Deve et al. |
| 6,336,495 B1 | 1/2002 | McCullough et al. |
| 6,485,796 B1 | 11/2002 | Carpenter et al. |
| 6,559,385 B1 | 5/2003 | Johnson et al. |
| 6,692,842 B2 * | 2/2004 | McCullough et al. ........ 428/611 |

OTHER PUBLICATIONS

ASTM E 228–95, "Standard Test Method for Linear Thermal Expansion of Solid Materials with a Vitreous Silica Dilatometer," *Annual Book of ASTM Standards*, vol. 08.01, (1995), pp. 70–76.

ASTM E 345–93, "Standard Test Methods of Tension Testing of Metallic Foil," *Annual Book of ASTM Standards*, vol. 02.03, (1993), pp. 376–380.

Blucher et al., "A New Pressure Infiltration Process for Continous Production of Fiber Reinforced MMC Structural Elements," *30th International SAMPE Technical conference Proceedings*, Oct, 20–24, 1998, pp. 442–455.

Cheng et al., "Preparation of Carbon Fibre Reinforced Aluminum via Ultrasonic Liquid Infiltration Technique," *Materials Science & Technology*, vol. 9, (1993), pp. 609–614.

Costello, "Testing of a Wire Rope," in *Theory of Wire Rope*, 2nd Edition, Chapter 6, Springer–Verlag, (1997), title page and pp. 72–85.

Davis et al., Eds., "Metals Handbook® Ninth Edition vol. 15 Casting," ASM International, Metals Park, Ohio, date unknown but believed to be prior to filing date of the priority application, title page, publication page, pp. 238–241, 275, 281–282, 300–304, 372–373, 487–488, and 755–757.

Dupont Product Brochure, "Technical Data FP/Aluminum Composites," date unknown but believed to be prior to filing date of the priority application, p. 81.

Electric Power Research Institute, "Structural Composite Cores for Overhead Power Transmission Conductors," *EM–5110, Research Project 2426–9*, (1987), 39 pages.

Gigerenzer et al., "Drawing of Graphite Fiber Reinforced Aluminum Composites," *Failure Modes and Processing of Composites IV*, eds., J.A. Cornie and F. W. Crossman, (1977), pp. 359–369.

Gigerener et al., "Hot Drawing of Fiber (Filoment) Reinforced Metal–Matrix Composites," *ICCM2, Proceedings of the 1978 International Conference on Composite Materials*, Toronto, Canada, Apr. 16–20, 1978, title page and pp. 175–188.

Goddard et al., "Continuous Graphite Fiber MMCs," *Engineered Materials Handbook*, vol. 1: Composites, ASM International, (1987) pp. 867–873.

Hunn, "MMC Overview—1985, " *SME Composites in Manufacturing 5*, Technical Paper, Los Angeles, California, EM86–106, Jan. 13–16, 1986, 14 pages.

Isaacs et al., "Structure and Plasticity of Aluminum Reinforced with Continuous Alumina Fibers," *Proceedings of the 12th International Riso Symposium of Metallurgy and Materials Science: Metal Matrix Composites—Processing, Microstructure and Properties*, (1991), pp. 399–404.

Kaiser Aluminum and Chemical ISales, Inc., *Casting Kaise Aluminum*, "Pig and Ingot Product Data Casting Practices and Characteristics of Molten Aluminum," Oakland, California, (1956), title page, publication page, and pp. 59–61.

Katzman, "Fiber Coatings for Composite Fabrication," *Materials & Manufacturing Processes*, vol. 5(1), (1990), pp. 1–15.

Nippon Carbon Co. Ltd., "Development of Wire Composite (SiC Fibre "NICALON" Reinforced Aluminum Composite Materials," (Internal Report), date unknown but believed to be prior to filing of the priority application, pp. 1–24.

Ozawa et al., "Development and Evaluation Characteristics of SiC Fiber Reinforced Aluminum Composite Wires for Transmission Line," *The Electricity Society Electronics and Energy Department Symposium*, (1995), 6 pages and translation, 9 pages.

Ozawa et al., "Mechnical Characteristics of SiC Fiber Reinforced Aluminum Composite Material," *The Electicity Society National Symposium*, (1995), 1 page and translation, 2 pages.

Ozawa et al., "Mechanical Characteristics of SiC Fiber Reinforced Composite Wire," *The Electricity Society National Symposium*, (1996), 2 pages and translation, 3 pages.

Pan et al., "Application of Ultrasonic Infiltration in Metal Matrix Composites," *Key Engineering Materials*, vols. 104–107, (1995), pp. 275–282.

Pan et al., "A Study of the Ultrasonic Technique Applied in Fabrication of SiC Fiber–Reinforced Aluminum Composites," *Journal of Material Research*, vol. 10(3), (1995), pp. 596–601.

Ronald et al., "Advanced Materials to Fly High in NASP," *Advanced Materials & Processes*, vol. 5, (1989), pp. 29–35.

Tokyo Rope Mfg. Co. Ltd., "Technical Data on CFCC," (Internal Report), Tokyo, Japan date unknown but believed to be prior to filing date of the prioirty application, 45 pages.

Yasutomi et al., "Effects of the SiC/Al Interface Reaction of Fracture Behavior on a Composite Conductor Using SiC Fiber Reinforced Aluminum for Next Generation Power Equipment," *Journal of Materials Science*, vol. 34, (1999), pp. 1583–1593.

Product Bulletin,"3M Ceramic Fiber Products 3M™ Nextel™ 440 Woven Fabrics", © 3M 1997 98–0400–4843–5.

Patent Abstract of Japan, vol. 1996, No. 04, Apr. 30, 1996 & JP 07 335029 A (Furukawa Electric Co. Ltd.; The), Dec. 22, 1995 the whole document.

Barnes, Electric Cables, London, Sir Isaac Pitman & Sons Ltd., pp. Frontspiece and 110–115.

High–Performance Composites, Mar./Apr. 1999, p. 24.

Mechanical Engineering, Jun. 1999, "Running Energy" beginning pp. 58–61.

* cited by examiner

ALUMINUM MATRIX COMPOSITE WIRE

CROSS REFERENCE TO RELATED APPLICATIONS

This application is a continuation of U.S. application Ser. No. 09/616,741, filed Jul. 14, 2000, now U.S. Pat. No. 6,723,451.

GOVERNMENT LICENSE RIGHTS

The U.S. Government has a paid-up license in this invention and the right in limited circumstances to require the patent owner to license others on reasonable terms as provided for by the terms of Contract No. MDA 972-90-C-0018 awarded by the Defense Advanced Research Projects Agency (DARPA).

FIELD OF THE INVENTION

The present invention pertains to composite wires reinforced with substantially continuous ceramic oxide fibers within an aluminum matrix and cables incorporating such wires.

BACKGROUND OF THE INVENTION

Metal matrix composites (MMC's) have long been recognized as promising materials due to their combination of high strength and stiffness combined with low weight. MMC's typically include a metal matrix reinforced with fibers. In selection of the fiber, it is widely acknowledged that one desires reinforcement fibers possessing high strength, a high elastic modulus, and a low coefficient of thermal expansion.

The use of metal matrix composites in the form of wires as a reinforcing member in bare overhead power transmission cables is of particular interest. The need for new materials in such cables is driven by the need to increase the power transfer capacity of existing transmission infrastructure due to load growth and changes in power flow due to deregulation. Desired performance requirements for such new materials include corrosion resistance, environmental endurance (e.g., UV and moisture), retention of strength at elevated temperatures, and creep resistance.

Important properties for performance are elastic modulus, density, coefficient of thermal expansion, conductivity, and strength. These properties are typically governed by the choice and purity of constituents (i.e., material of the metal matrix and fiber content) in combination with the fiber volume fraction. Of these properties, emphasis has been placed on the development of wires made from fibers with high tensile strength and stiffness. The focus on producing materials of high strength is driven in part by the assumption that in order for the composite to compete economically with conventional materials such as steel, its strength should be as high as possible. For example, in Ozawa et al., "Mechanical Properties of Composite Conductors using SiC Fiber Resinforced Aluminum Composite Wires," The Electricity Society National Symposium, 1996, which discloses an aluminum wire reinforced with high strength fiber marketed under the trade designation "NICALON," the need for MMC wires of "high strength" for use in overhead power transmission cables is described.

There is still a need for composite materials that have suitable properties for use in a wide variety of cables, particularly overhead power transmission cables.

SUMMARY OF THE INVENTION

The present invention relates to substantially continuous fiber aluminum matrix composites. Embodiments of the present invention pertain to aluminum matrix composite articles, preferably elongated metal composite articles such as wires, tapes, etc. Such articles preferably include a plurality of substantially continuous, longitudinally positioned fibers contained within a matrix that includes aluminum (e.g., high purity aluminum or alloys thereof). Preferably, the matrix of the wire includes at least 99.95 percent by weight aluminum, based on the total weight of the matrix.

The aluminum matrix composites of the present invention are formed into wires exhibiting desirable strength-to-weight and thermal expansion characteristics, high electrical conductivity, and low modulus. Such wires are well-suited for use as core materials in power transmission cables, as they provide electrical and physical characteristics which offer improvements over power transmission cables known in the prior art.

The materials of the present invention are advantageous for wires and cables because they provide less sag when heated due to the low coefficient of thermal expansion. Additionally, compared with steel wires or composite wires reinforced with high modulus materials, the wires of the present invention are capable of reducing the tension on supporting towers when the cables are exposed to high mechanical loads (such as combined ice and wind load) due to their low modulus.

In one embodiment, the present invention provides an aluminum matrix composite article that includes a:plurality of fibers in a matrix including aluminum. In this embodiment, the fibers include, on a theoretical oxide basis, $Al_2O_3$ in a range of about 35 weight percent to about 75 weight percent, $SiO_2$ in a range of greater than zero weight percent to less than about 50 weight percent, and $B_2O_3$ in a range of greater than about 5 weight percent, based on the total metal oxide content of the respective fiber. In this embodiment the wire has a nonlinear coefficient of thermal expansion over a temperature of $-75°$ C. to $500°$ C., a modulus of no greater than about 105 GPa (15 Msi), and an average tensile strength of at least about 350 MPa (50 ksi).

In another embodiment, the present invention provides an aluminum matrix composite wire that includes a plurality of substantially continuous, longitudinally positioned fibers in a matrix including aluminum. In this embodiment, the fibers include, on a theoretical oxide basis, $Al_2O_3$ in a range of about 35 weight percent to about 75 weight percent, $SiO_2$ in a range of greater than zero weight percent to less than about 50 weight percent, and $B_2O_3$ in a range of greater than about 5 weight percent, based on the total metal oxide content of the respective fiber. In this embodiment the wire has a nonlinear coefficient of thermal expansion over a temperature of $-75°$ C. to $500°$ C., a modulus of no greater than about 105 GPa (15 Msi), and an average tensile strength of at least about 350 MPa (50 ksi).

In another embodiment, the present invention provides a method for making an aluminum matrix composite wire that includes a plurality of substantially continuous, longitudinally positioned fibers in a matrix that includes aluminum. The method includes: providing a contained volume of molten matrix material; immersing a plurality of substantially continuous fibers into the contained volume of molten matrix material wherein the fibers comprise, on a theoretical oxide basis, $Al_2O_3$ in a range of about 35 weight percent to about 75 weight percent, $SiO_2$ in a range of greater than zero weight percent to less than about 50 weight percent, and $B_2O_3$ in a range of greater than about 5 weight percent, based on the total metal oxide content of the respective fiber;

imparting ultrasonic energy to cause vibration of at least a portion of the contained volume of molten matrix material to permit at least a portion of the molten matrix material to infiltrate into and wet the plurality of fibers such that an infiltrated, wetted plurality of fibers is provided; and withdrawing the infiltrated, wetted plurality of fibers from the contained volume of molten matrix material under conditions which permit the molten matrix material to solidify to provide an aluminum matrix composite wire comprising a plurality of the fibers, wherein the fibers are substantially continuous, longitudinally positioned in a matrix including aluminum, and wherein the wire has a nonlinear coefficient of thermal expansion over a temperature of −75° C. to 500° C., a modulus of no greater than about 105 GPa, and an average tensile strength of at least about 350 MPa.

In another embodiment, the present invention provides a cable that includes at least one aluminum matrix composite wire that includes a plurality of substantially continuous, longitudinally positioned fibers in a matrix including aluminum. In this embodiment, the fibers include, on a theoretical oxide basis, $Al_2O_3$ in a range of about 35 weight percent to about 75 weight percent, $SiO_2$ in a range of greater than zero weight percent to less than about 50 weight percent, and $B_2O_3$ in an amount of greater than about weight 5 percent, based on the total metal oxide content of the respective fiber. Furthermore, in this embodiment, the wire has a nonlinear coefficient of thermal expansion over a temperature of −75° C. to 500° C., a modulus of no greater than about 105 GPa, and an average tensile strength of at least about 350 MPa.

In yet another embodiment, the present invention provides an aluminum matrix composite wire that includes a plurality of substantially continuous, longitudinally positioned ceramic oxide fibers in a matrix including aluminum. In this embodiment, the ceramic oxide fibers have a modulus of no greater than about 173 GPa (25 Msi), and the wire has a modulus of no greater than about 105 GPa.

In a further embodiment, the present invention provides a cable that includes at least one aluminum matrix composite wire that includes a plurality of substantially continuous, longitudinally positioned ceramic oxide fibers in a matrix comprising aluminum. In this embodiment, the fibers have a modulus of no greater than about 240 GPa (35 Msi), and the wire has a modulus of no greater than about 105 GPa and an average tensile strength of at least about 350 MPa.

DEFINITIONS

As used herein, the following terms are defined as:

"Substantially continuous fiber" means a fiber having a length that is relatively infinite when compared to the average effective fiber diameter. Typically, this means that the fiber has an aspect ratio (i.e., ratio of the length of the fiber to the average effective diameter of the fiber) of at least about $1\times10^5$, preferably, at least about $1\times10^6$, and more preferably, at least about $1\times10^7$. Typically, such fibers have a length on the order of at least about 50 meters, and may even have lengths on the order of kilometers or more.

"Average effective diameter" means the true diameter of a circle having the same cross-sectional area as the measured object. For example, a circular fiber or wire has a measurable diameter from which the area may be accurately computed as $\pi d^2/4$. Non-circular, elliptical, oval, or irregular shaped fibers or wires do not have a single measurable diameter, although the cross-sectional area may be measured, and then a diameter computed that would create a circle of the same cross-sectional area. This diameter of the circle is termed the effective diameter. The average effective diameter is the numerical average of several computed effective diameters.

"Longitudinally positioned" means that the fibers are oriented in the same direction as the length of the wire.

"Coefficient of thermal expansion (CTE)" means the rate of change of thermal expansion over a specified temperature range measured in the longitudinal direction of the fiber and/or wire. That is:

thermal expansion coefficient=(change in dimensions)/(change in temperature).

The instantaneous CTE value is then the slope of the thermal expansion vs. temperature graph calculated at a specific temperature (i.e., the derivative of the equation of the curve plotting thermal expansion versus temperature).

"Nonlinear CTE over a temperature of −75° C. to 500° C." means that a second order curve fit of segments between inflections on a graph of the percent thermal expansion vs.,temperature within the specified temperature range shows alternating positive and negative slopes.

"Average tensile strength" means the numerical average of the measured tensile strengths of several fiber, wire, or cable samples.

"Longitudinal tensile strength" means the stress at which the fiber, wire, or cable fails when tested in the direction of the major axis of the fiber, wire, or cable. This is also equal to the maximum stress applied to the sample. The stress, S, is computed as S=L/A, where L is the maximum load measured during the tensile test and A is the cross-sectional area of the sample prior to testing.

"Modulus" means the longitudinal tensile modulus. It is the tensile stiffness of the fiber, wire, or cable as measured in the direction of the major axis of the sample. It represents the average stress per unit strain for the sample measured over a given strain increment or strain range. For the wire, modulus is measured between 0 and 0.05% strain.

"Cable modulus" means the elastic tensile modulus of the cable. The cable modulus is obtained by loading and unloading a cable using tensile testing apparatus to obtain a load-unload deformation curve. The cable is loaded sufficiently so that the constructional stretch of the cable has been taken up and the cable is elastically deformed. The data from the unload region of the curve is used to calculate the cable modulus. This is further described in "Theory of Wire Rope" in Theory of Wire Rope, Chapter 6, George A. Costello, Springer-Verlag (1997). The cable modulus can be calculated from measured load-displacement data using the following equation:

$$E = \Delta F / Ae$$

where

E is the calculated cable modulus $\Delta F$ is change in measured load in the measurement region A is the total cross-sectional area of the wire in the cable determined prior to testing e is the change in the measured elongation of the cable in the measurement region specifically, $$e = (l_f - l_0)/l_0$$

where $l_0$ is the initial length of the cable in the measurement region $l_f$ is the final length of the cable in the measurement region "Average strain to failure" means the tensile strain to failure and is the numerical average of the measured strain to failure for several samples. The strain to failure is the elongation or extension of the sample per unit length. It can be represented as:

$$e = (l_f - l_0)/l_0$$

where e is the elongation or extension of the sample per unit length;

$l_f$ is the final gauge length of the sample; and $l_0$ is the initial gauge length of the sample.

"Theoretical fiber strain to failure" is the strain to failure of the fiber calculated using the average fiber tensile strength and is defined by the relationship:

$$stress = modulus \times strain$$

Thus strain=stress/modulus. For fibers available under the trade designation "NEXTEL 312," the measured average tensile stress was 1.68 GPa (244 ksi) and the modulus is reported as 151 GPa (22 Msi). Therefore the strain is 1.1% and the theoretical fiber strain to failure is 1.1%.

DETAILED DESCRIPTION OF PREFERRED EMBODIMENTS

Figure 1:
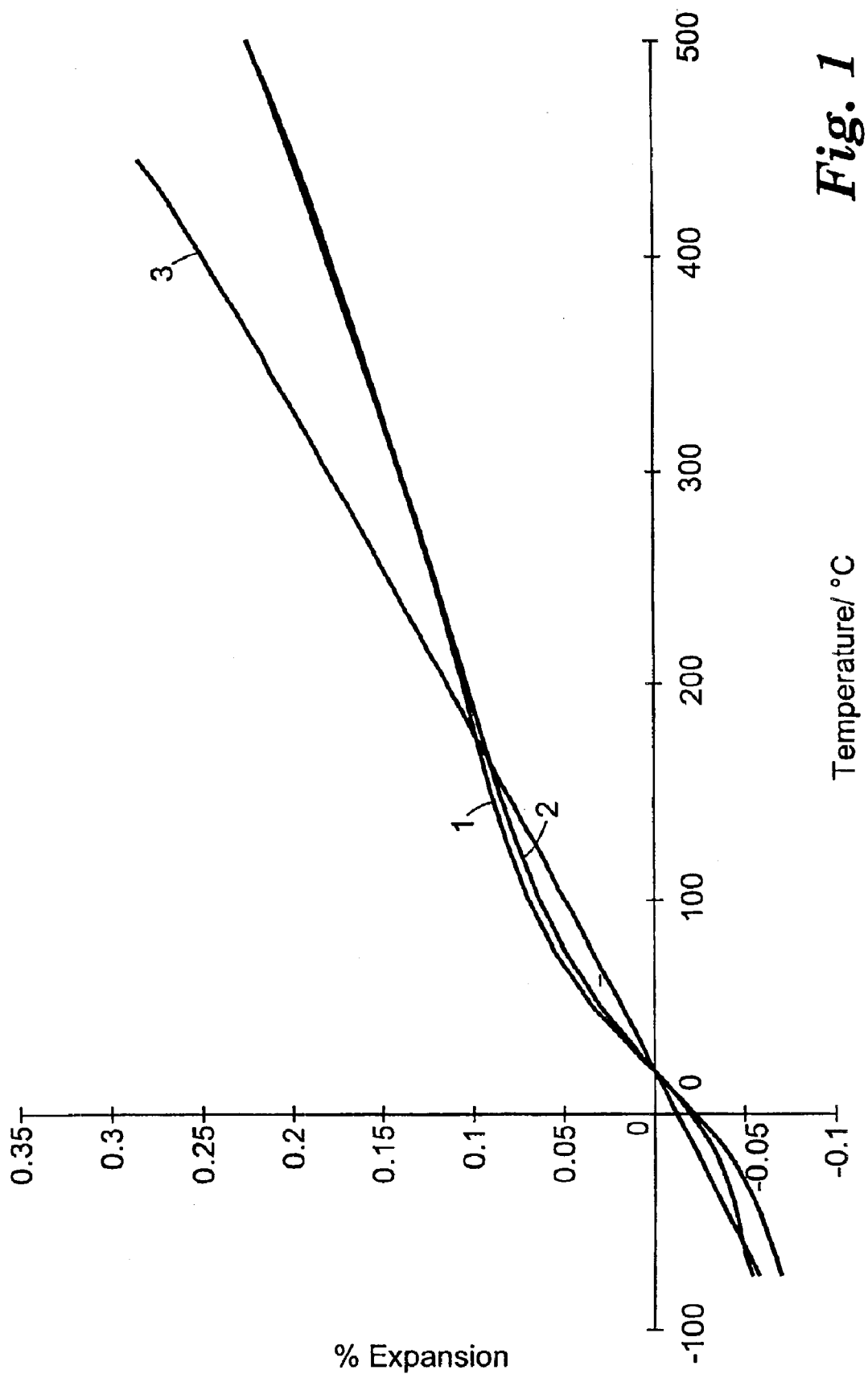
FIG. 1 is a graph showing the percentage expansion as a function of temperature for two samples of a wire of the present invention containing fibers marketed by the 3M Company, St. Paul, Minn., under the trade designation "NEXTEL 312" (lines 1 and 2) compared to a wire containing fibers marketed by the 3M Company, St. Paul, Minn., under the trade designation "NEXTEL 610" (line 3).

The present invention is based on the discovery that low strength materials, produced from fibers that would not typically be considered suitable as a reinforcement can be produced and that such materials can compete directly with the high performance materials in development today for applications such as overhead electrical power transmission. The present invention provides articles, preferably elongated metal composite articles, such as wires, tapes, etc., that include a plurality of substantially continuous, longitudinally positioned fibers contained within a matrix that includes aluminum (e.g., high purity aluminum or alloys thereof).

The present invention provides composite articles, such as wires and cables, that include fiber reinforced aluminum matrix composites. A composite wire according to the present invention includes a plurality of substantially continuous, longitudinally positioned, reinforcing fibers (preferably, ceramic oxide, and most preferably, $Al_2O_3$-based reinforcing fibers) encapsulated within a matrix that includes aluminum and optionally one or more other metals (preferably, highly pure elemental aluminum or alloys of pure aluminum with other elements, such as copper). Preferably, at least about 85% by number of the fibers are substantially continuous in a wire according to the present invention. At least one wire according to the present invention can be combined into a cable, preferably, a transmission cable.

Fibers

The substantially continuous reinforcing fibers preferably have an average effective fiber diameter of at least about 5 micrometers. Preferably, the average effective fiber diameter is no greater than about 50 micrometers, and more preferably, no greater than about 25 micrometers.

Preferred fibers are those that have a coefficient of thermal expansion of no more than about $10 \times 10^{-6}/°$ C. (25° C.–1000° C.). Typically, polycrystalline $\alpha$-$Al_2O_3$ fibers have a coefficient of thermal expansion of no more than about $8 \times 10^{-6}/°$ C. By incorporating other oxides, such as $SiO_2$, $B_2O_3$, $Cr_2O_3$, or mixtures thereof, the coefficient of thermal expansion can be reduced. Because this can also reduce the tensile strength of the fibers to about 1.4 GPa, for example, it was unexpected that useful cable could be made using such fibers.

More preferably, the fibers have an average coefficient of thermal expansion of no more than about $7.9 \times 10^{-6}/°$ C. (25° C.–500° C.), and most preferably, no more than about $5 \times 10^{-6}/°$ C. (25° C.–500° C.). Preferably, the fibers have a coefficient of thermal expansion of at least about $3 \times 10^{-6}/°$ C. (25° C.–500° C.), and more preferably, at least about $2 \times 10^{-6}/°$ C. (25° C.–500° C.).

Preferably, the fibers have an average tensile strength of at least about 1.4 GPa; more preferably, at least about 1.7 GPa; even more preferably, at least about 2.1 GPa; and most preferably, at least about 2.8 GPa.

Preferably, the fibers have a modulus of no greater than about 240 GPa (35 Msi), and more preferably, no greater than about 173 GPa (25 Msi). Preferably, fibers have a modulus of greater than about 69 GPa (10 Msi).

The elastic modulus and strength of various fibers is as follows.

| Fiber | Modulus (Msi (GPa)) | % Elongation | Tensile Strength (ksi (MPa)) |
|---|---|---|---|
| "NEXTEL 312" | 22 (152) | 1.2 | 250 (1720) |
| "NEXTEL 440" | 27 (186) | 1.1 | 300 (2070) |
| "NEXTEL 610" | 54 (372) | 0.8 | 400 (2750) |

-continued

| Fiber | Modulus (Msi (GPa)) | % Elongation | Tensile Strength (ksi (MPa)) |
|---|---|---|---|
| "ALTEX" | 30 (207) | 0.9 | 300 (2070) |
| "NEXTEL 720" | 38 (262) | 0.8 | 300 (2070) |
| "ALMAX" | 48 (331) | 0.5 | 260 (1790) |

Preferably, fibers according to the present invention have an average strain to failure of no greater than about 2.5%, more preferably, no greater than about 1.2%, and most preferably, no greater than about 1.0%.

Examples of substantially continuous ceramic oxide fibers that may be useful for making aluminum matrix composite materials according to the present invention include ceramic oxide (e.g., aluminoborosilicate) fibers. Typically, the ceramic oxide fibers are crystalline ceramics and/or a mixture of crystalline ceramic and glass (i.e., a fiber may contain both crystalline ceramic and glass phases).

Ceramic fibers are available commercially as single filaments, or grouped together in, for example, yarns or tows. Tows are well known in the fiber art and refer to a plurality of (individual) fibers (typically, at least 100 fibers, and more typically, at least 400 fibers) collected in a rope-like form. Yarns or tows preferably include at least 780 individual fibers per tow, and more preferably at least 2600 individual fibers per tow. Ceramic fibers are available in a variety of lengths, including 300 meters and larger. The fibers may have a cross-sectional shape that is circular or elliptical.

Preferred fibers include suitable aluminoborosilicate fibers are described in U.S. Pat. No. 3,795,524 (Sowman). Preferably, the aluminoborosilicate fibers comprise, on a theoretical oxide basis: about 35 percent by weight to about 75 percent by weight (more preferably, about 55 percent by weight to about 75 percent by weight) $Al_2O_3$; greater than 0 percent by weight (more preferably, at least about 15 percent by weight) and less than about 50 percent by weight (more preferably, less than about 45 percent, and most preferably, less than about 44 percent) $SiO_2$; and greater than about 5 percent by weight (more preferably, less than about 25 percent by weight, even more preferably, about 1 percent by weight to about 5 percent by weight, and most preferably, about 10 percent by weight to about 20 percent by weight) $B_2O_3$, based on the total weight of the aluminoborosilicate fibers. Preferred aluminoborosilicate fibers are commercially available under the trade designation "NEXTEL 312" from the 3M Company.

Other suitable fibers include aluminosilicate fibers commercially available under the trade designations "NEXTEL 550" and "NEXTEL 720" from the 3M Company.

Commercially available fibers typically include an organic sizing material added to the fiber during their manufacture to provide lubricity and to protect the fiber strands during handling. It is believed that the sizing tends to reduce the breakage of fibers, reduces static electricity, and reduces the amount of dust during, for example, conversion to a fabric. The sizing can be removed, for example, by dissolving or burning it away. Preferably, the sizing is removed before forming the aluminum matrix composite wire according to the present invention. In this way, before forming the aluminum matrix composite wire, the ceramic oxide fibers are free of any coatings thereon.

It is also within the scope of the present invention to have coatings on fibers. Coatings may be used, for example, to enhance the wettability of the fibers, to reduce or prevent reaction between the fibers and molten metal matrix material. Such coatings and techniques for providing such coatings are known in the fiber and metal matrix composite art.

Wires

Wires according to the present invention preferably include at least about 15 volume percent fiber, more preferably, at least about 25 volume percent fiber, and most preferably, at least about 28 volume percent fiber, based on the total volume of the wire. Preferably, they include no more than about 65 volume percent fiber, more preferably, no more than about 55 volume percent fiber, and most preferably, no more than about 50 volume percent fiber, based on the total volume of the wire. Certain preferred cables also include these volumes of fibers.

Wires according to the present invention have a length, in order of preference, of at least about 50 meters, at least about 100 meters, at least about 200 meters, at least about 300 meters, at least about 400 meters, at least about 500 meters, at least about 600 meters, at least about 700 meters, at least about 800 meters, and at least about 900 meters. The wire density is typically about 2.5 grams per cubic centimeter to about 2.8 grams per cubic centimeter.

The average effective diameter of the wire of the present invention is preferably at least about 0.25 millimeter (mm), more preferably, at least about 1 mm, and more preferably at least about 1.5 mm.

Wires according to the present invention preferably exhibit a surprising nonlinear coefficient of thermal expansion (CTE). More preferably, wires according to the present invention have a coefficient of thermal expansion behavior represented by lines 1 or 2 of the graph of FIG. 1, which is further explained in Example 1.

Wires according to the present invention preferably have an average tensile strength of at least about 350 MPa (50 ksi). More preferably, wires according to the present invention have an average tensile strength of no greater than about 1400 MPa (200 ksi), and most preferably, no greater than about 700 MPa (100 ksi).

Preferably, wires according to the present invention have a longitudinal tensile strength of at least about 90% of the theoretical fiber strain to failure for all fiber fractions, and more preferably, at least about 95%, of the theoretical fiber strain failure for fiber fractions less than or equal to 35 volume percent fiber. The theoretical fiber strain to failure can be calculated according to the equation found in the Definitions Section. The fiber strength used to determine these values was measured to be 1.68 GPa (244 ksi).

Preferably, wires according to the present invention have a modulus of no greater than about 105 GPa (15 Msi), and more preferably, no greater than about 84 GPa (12 Msi). Preferably, wires according to the present invention have a modulus of at least about 40 GPa (6 Msi), and more preferably, at least about 49 GPa (7 Msi). The lower values for modulus typically occur for wires with lower volume fractions of fiber. It is surprising is that the modulus can be less than 69 GPa (10 Msi), which is the modulus of aluminum and typically less than the modulus of either constituent in the composite wire.

Preferably, wires according to the present invention have an average strain to failure of no greater than about 2.5%, more preferably, no greater than about 1.2%, and most preferably, no greater than about 1.0%.

The metal matrix materials include aluminum and alloys thereof (e.g., an alloy of aluminum and copper). Preferably, the aluminum matrix comprises at least 98 percent by weight aluminum, more preferably, at least 99 percent by weight aluminum, even more preferably, greater than 99.9 percent by weight aluminum, and most preferably, greater than 99.95 percent by weight aluminum. Preferred aluminum alloys of aluminum and copper comprise at least about 98 percent by weight Al and up to about 2 percent by weight Cu. Aluminum and aluminum alloys are commercially available. For example, aluminum is available under the trade designations "SUPER PURE ALUMINUM; 99.99% Al" from Alcoa of Pittsburgh, Pa. Aluminum alloys (e.g., Al-2% by weight Cu (0.03% by weight impurities)) can be obtained from Belmont Metals, New York, N.Y.

The particular fibers, matrix material, and process steps for making metal matrix composite wire according to the present invention are selected to provide aluminum matrix composite wire with the desired properties. For example, the fibers and aluminum matrix materials are selected to be sufficiently compatible with each other and the wire fabrication process in order to make the desired wire.

Additional details regarding some preferred techniques for making aluminum and aluminum alloy matrix wires are disclosed, for example, in copending application having U.S. Ser. No. 08/492,960, and PCT application having publication No. WO 97/00976, published May 21, 1996.

Continuous metal matrix composite wire according to the present invention can be made, for example, by metal matrix infiltration processes. In a preferred embodiment, the method includes: providing a contained volume of molten matrix material; immersing the plurality of substantially continuous fibers into the contained volume of molten matrix material; imparting ultrasonic energy to cause vibration of at least a portion of the contained volume of molten matrix material to permit at least a portion of the molten matrix material to infiltrate into and wet the plurality of fibers such that an infiltrated, wetted plurality of fibers is provided; and withdrawing the infiltrated, wetted plurality of fibers from the contained volume of molten matrix material under conditions which permit the molten matrix material to solidify to provide an aluminum matrix composite wire comprising a plurality of the fibers.

The use of ultrasonic energy as a matrix infiltration aid helps to overcome a problem of incomplete matrix infiltration of the fiber tow. For example, the processes disclosed in U.S. Ser. No. 08/492,960, and PCT application having publication No. WO 97/00976, published May 21, 1996, as well as U.S. patent application Ser. No. 09/616,589, filed on even date herewith, are methods of solving this problem.

Because of the possibility of reaction between the fiber and matrix, it is preferred to process the wire at a sufficiently fast speed to minimize the occurrence of such reactions. For a particularly preferred embodiment, the submerged length of fiber, i.e., the length for which the fiber is in contact with molten aluminum is 23 centimeters (9 inches) and the speed to process the wire is at least about 76 centimeters/minute (30 inches/minute). It was found that speeds of 38 centimeters/minute (15 inches/minute) caused reaction between fiber and matrix, whereas 76 centimeters/minute (30 inches/minute) wire speed did not cause any reaction.

Cables

Aluminum matrix composite wires according to the present invention can be used in a variety of applications. They are particularly useful in overhead electrical power transmission cables.

Cables according to the present invention may be homogeneous (i.e., including only one type of metal matrix composite wire) or nonhomogeneous (i.e., including a plurality of secondary wires, such as metal wires). As an example of a nonhomogeneous cable, the core can include a plurality of wires according to the present invention with a shell that includes a plurality of secondary wires (e.g., aluminum wires).

Cables according to the present invention can be stranded or nonstranded. A stranded cable typically includes a central wire and a first layer of wires helically stranded around the central wire. Cable stranding is a process in which individual strands of wire are combined in a helical arrangement to produce a finished cable (e.g., U.S. Pat. Nos. 5,171,942 (Powers) and U.S. Pat. No. 5,554,826 (Gentry)). The resulting helically stranded cable or wire rope provides far greater flexibility than would be available from a solid rod of equivalent cross sectional area. The helical arrangement is also beneficial because the stranded cable maintains its overall round cross-sectional shape when the cable is subject to bending in handling, installation and use. Helically wound cables may include as few as 7 individual strands to more common constructions containing 50 or more strands.

Figure 7:
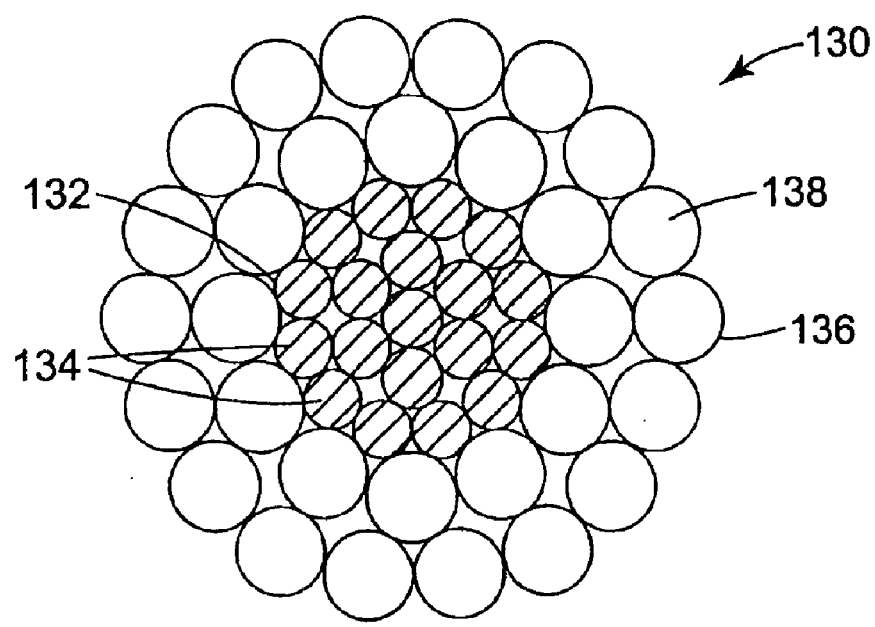
FIGS. 7 and 8 are schematic, cross-sections of two embodiments of overhead electrical power transmission cables having composite metal matrix cores.
Figure 8:
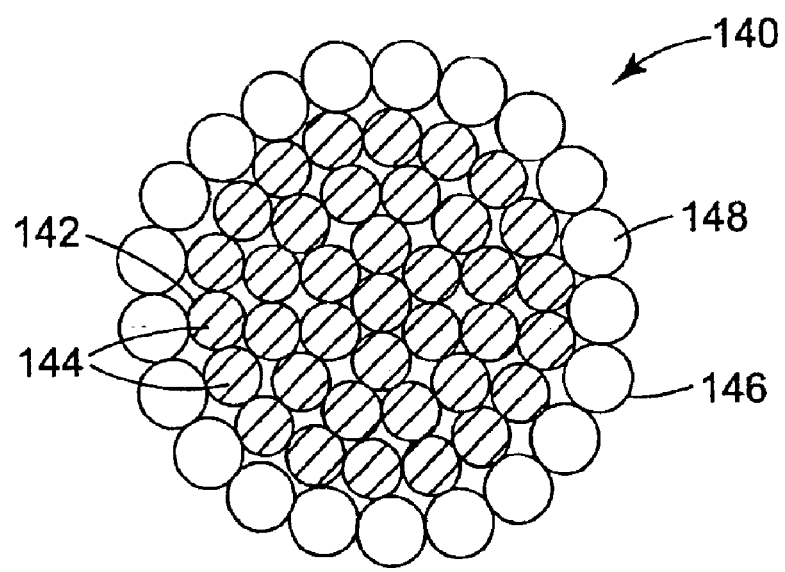

One exemplary electrical power transmission cable according to the present invention is shown in FIG. 7, where electrical power, transmission cable according to the present invention 130 may be a core 132 of nineteen individual composite metal matrix wires 134 surrounded by a jacket 136 of thirty individual aluminum or aluminum alloy wires 138. Likewise, as shown in FIG. 8, as one of many alternatives, overhead electrical power transmission cable according to the present invention 140 may be a core 142 of thirty-seven individual composite metal matrix wires 144 surrounded by jacket 146 of twenty-one individual aluminum or aluminum alloy wires 148.

Figure 9:
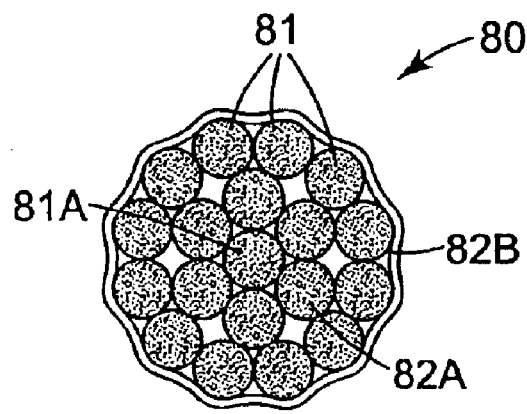
FIG. 9 is an end view of an embodiment of a stranded cable according to the present invention with a maintaining means around the plurality of strands.

FIG. 9 illustrates yet another embodiment of the stranded cable 80. In this embodiment, the stranded cable includes a central metal matrix composite wire 81A and a first layer 82A of wires that have been helically wound about the central metal matrix composite wire 81A. This embodiment further includes a second layer 82B of metal matrix composite wires 81 that have been helically stranded about the first layer 82A. Any suitable number of metal matrix composite wires 81 may be included in any layer. Furthermore, more than two layers may be included in the stranded cable 80 if desired.

Cables according to the present invention can be used as a bare cable or it can be used as the core of a larger diameter cable. Also, cables according to the present invention may be a stranded cable of a plurality of wires with a maintaining means around the plurality of wires. The maintaining means may be a tape overwrap, with or without adhesive, or a binder, for example.

Stranded cables of the present invention are useful in numerous applications. Such stranded cables are believed to be particularly desirable for use in overhead electrical power transmission cables due to their combination of low weight, high strength, good electrical conductivity, low coefficient of thermal expansion, high use temperatures, and resistance to corrosion.

Figure 10:
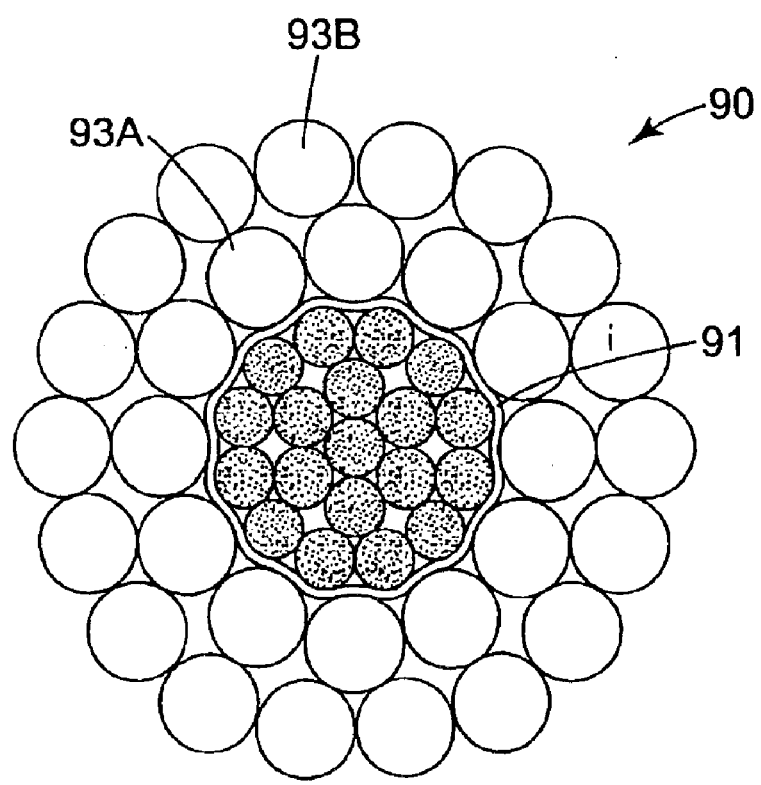
FIG. 10 is an end view of an embodiment of an electrical power transmission cable according to the present invention.

An end view of one preferred embodiment of such a transmission cable is illustrated in FIG. 10. Such a transmission cable includes a core 91, which can be any of the stranded cores described herein. The power transmission cable 90 also includes at least one conductor layer 93 about the stranded core 91. As illustrated, the power transmission cable includes two conductor layers 93A and 93B. More conductor layers may be used as desired. Preferably, each conductor layer 93 includes a plurality of conductor wires as is known in the art. Suitable materials for the conductor wires include aluminum and aluminum alloys. The conductor wires may be cabled about the stranded core 91 by suitable cable stranding equipment as is known in the art.

In other applications, in which the stranded cable is to be used as a final article itself, or in which it is to be used as an intermediary article or component in a different subsequent article, it is preferred that the stranded cable be free of electrical power conductor layers around the plurality of metal matrix composite wires.

Preferably, cables that include a plurality of nonstranded wires according to the present invention have a cable modulus of no greater than about 105 GPa (15 Msi), and more preferably, no greater than about 84 GPa (12 Msi). Preferably, cables that include a plurality of nonstranded wires according to the present invention have a cable modulus of at least about 42 GPa (6 Msi), and more preferably, at least about 49 GPa (7 Msi). Typically, the modulus of a stranded cable is reduced relative to that of a nonstranded cable due to the stranding configuration of helically wrapped layers of wires. This makes the cable less stiff than an arrangement of straight parallel wires. Thus, preferably, cables that include a plurality of stranded wires according to the present invention have a cable modulus of at least about 75%, more preferably, at least about 85%, and most preferably, at least about 95%, of the modulus of a cable that includes the same number, same cross-sectional area, and same types of nonstranded wires.

Additional information regarding cables made from wires according to the present invention are disclosed in U.S. patent application Ser. No. 09/616,784, filed on even date herewith.

EXAMPLES

This invention is further illustrated by the following examples, but the particular materials and amounts thereof recited in these examples, as well as other conditions and details, should not be construed to unduly limit this invention. Various modifications and alterations of the invention will become apparent to those skilled in the art. All parts and percentages are by weight unless otherwise indicated.

Test Methods
Fiber Strength

Fiber strength was measured using a tensile tester (commercially available as Instron 4201 tester from Instron of Canton, Mass.), and the test described in ASTM D 3379-75, (Standard Test Methods for Tensile Strength and Young's Modulus for High Modulus Single-Filament Materials). The specimen gauge length was 25.4 mm (1 inch), and the strain rate was 0.02 mm/mm.

To establish the tensile strength of a fiber tow, ten single fiber filaments were randomly chosen from a tow of fibers and each filament was tested to determine its breaking load. Each individual, randomly selected fiber had strength ranging from 1.31–1.96 GPa (191–285 ksi). The average individual filament tensile strength was 1.68 GPa (244 ksi). Fiber diameter was measured optically using an attachment to an optical microscope (Dolan-Jenner Measure-Rite Video Micrometer System, Model M25-0002, commercially available from Dolan-Jenner Industries, Inc. of Lawrence Mass.) at ×1000 magnification. The apparatus used reflected light observation with a calibrated stage micrometer.

The breaking stress of each individual filament was calculated as the load per unit area.
Wire Tensile Strength Tensile properties of the composite wires were determined substantially as described in ASTM E345-93, using a tensile tester (commercially available under the trade designation "INSTRON"; Model 8562 Tester from Instron Corp., Canton, Mass.) fitted with a mechanical alignment fixture (obtained under the trade designation "INSTRON"; Model No. 8000-072 from Instron Corp.) that was driven by data acquisition system (obtained under the trade designation "INSTRON"; Model No. 8000-074 from Instron Corp.).

Testing was performed using a 5-cm (2-inch) gauge length sample fitted with 1018 mild steel tube tabs on the ends of the wire to allow secure gripping by the test apparatus. The actual length of the wire sample was 20 cm (8 inches) longer than the sample gauge length to accommodate installation of the wedge grips. For composite wires having a diameter of 2.06 mm (0.081 inch) or less, the tubes were 15 cm (6 inches) long, with an OD (i.e., outside diameter) of 6.35 mm (0.25 inch) and an ID (i.e., inside diameter) of 2.9–3.2 mm (0.115–0.125 inch). The ID and OD should be as concentric as possible. The steel tubes and wire sample were cleaned with alcohol and a 10 cm (4 inch) distance marked from each end of the wire sample to allow proper positioning of the gripper tube to achieve the desired gauge length of 5.0 cm. The bore of each gripper tube was filled with an epoxy adhesive (available under the trade designation "SCOTCH-WELD 2214 HI-FLEX", a high ductility adhesive, part no. 62-3403-2930-9, from the 3M Company) using a sealant gun (obtained under the trade designation "SEMCO", Model 250, from obtained from Technical Resin Packaging, Inc., Brooklyn Center, Minn.) equipped with a plastic nozzle (obtained from Technical Resin Packaging, Inc.). Excess epoxy resin was removed from the tubes and the wire inserted into the tube to the mark on the wire. Once the wire was inserted into the gripper tube additional epoxy resin was injected into the tube, while holding the wire in position, to ensure that the tube was full of resin. (The resin was back filled into the tube until epoxy just squeezed out around the wire at the base of the gauge length while the wire, was maintained in position). When both gripper tubes were properly positioned on the wire the sample was placed into a tab alignment fixture that maintained the proper alignment of the gripper tubes and wire during the epoxy cure cycle. The assembly was subsequently placed in a curing oven maintained at 150° C. for 90 minutes to cure the epoxy.

The test frame was carefully aligned in the Instron Tester using a mechanical alignment device on the test frame to achieve the desired alignment. During testing only the outer 5 cm (2 inches) of the gripper tubes were gripped by serrated V-notch hydraulic jaws using a machine clamping pressure of approximately 2–2.5 ksi (14–17 MPa).

A strain rate of 0.01 cm/cm (0.01 inch/inch) was used in a position control mode. The strain was monitored using a dynamic stain gauge extensometer (obtained under the trade designation "INSTRON", Model No. 2620-824 from Instron Corp.). The distance between extensometer knife edges was 1.27 cm (0.5 inch) and the gauge was positioned at the center of the gauge length and secured with rubber bands. The wire diameter was determined using either micrometer measurements at three positions along the wire or from measuring the cross-sectional area and calculating the effective diameter to provide the same cross-sectional area. Output from the tensile test provided load to failure, tensile strength, tensile modulus, and strain to failure data for the samples. Five samples were tested, from which average, standard deviation, and coefficient of variation were reported for each property.
Coefficient of Thermal Expansion (CTE)

The CTE was measured following ASTM E-228, published in 1995. The work was performed on a dilatometer (obtained under the trade designation "UNITHERM 1091"), using a wire length of 2 inches (5.1 cm). Calibration of the equipment prior to testing was performed using a (NIST) certified fused silica calibration reference sample (obtained under the trade designation "Fused Silica" from NIST of Washington, D.C.). Samples were tested over a temperature range from −75° C. to 500° C. with a heating ramp rate of 5° C. in a laboratory air atmosphere. The output from the test was a set of data of dimension expansion vs. temperature that were collected every 10° C. during heating. Since CTE is the rate of change of expansion with temperature the data required processing to obtain a value for the CTE. The expansion vs. temperature data was plotted in a standard graphical software package (obtained under the trade designation "EXCEL" from Microsoft, Redmond, Wash.). A second order power function was fit to the data using the standard fitting functions available in the software to obtain an equation for the curve. The derivative of this equation was calculated, yielding a linear function. This equation represented the rate of change of expansion with temperature. This equation was plotted over the temperature range of interest, e.g., −75–500° C., to give a graphical representation of CTE vs. temperature. The equation was also used to obtain the instantaneous CTE at any temperature. In the case of non-linear behavior, the expansion vs. temperature curve was sub-divided into regions between the inflection points where the above second order power function fitting may be satisfactorily performed.

The CTE is typically dependent on fiber volume fraction, although in the range of interest, it was expected, and assumed, the CTE did not change significantly as a function of fiber volume fraction. The CTE was assumed to change according to the equation:

$$\alpha_{cl}=[E_f\alpha_f V_f+E_m\alpha_m(1-V_f)]/(E_f V_f+E_m(1-V_f))$$

where $V_f$=fiber volume fraction
$E_f$=fiber tensile modulus
$E_m$=matrix tensile modulus (in-situ)
$\alpha_{cl}$=composite CTE in the longitudinal direction
$\alpha_f$=fiber CTE
$\alpha_m$=matrix CTE Diameter The diameter of the wire was measured by taking micrometer readings at four points along the wire. Typically the wire was not a perfect circle and so there was a long and short aspect. The readings were taken by rotating the wire to ensure that both the long and short aspect were measured. The diameter was reported as the average of long and short aspect.

Fiber Volume Fraction

The fiber volume fraction was measured by a standard metallographic technique. The wire cross-section was polished and the fiber volume fraction measured by using the density profiling functions with the aid of a computer program called NIH IMAGE (version 1.61), a public domain image-processing program developed by the Research Services Branch of the National Institutes of Health (obtained from website http//rsb.info.nih.gov/nih-image). This software measured the mean gray scale intensity of a representative area of the wire.

A piece of the wire was mounted in mounting resin (obtained under the trade designation "EPOXICURE" from Buehler In., Lake Bluff, Ill.). The mounted wire was polished using a conventional grinder/polisher (obtained from Struers, West Lake, Ohio) and conventional diamond slurries with the final polishing step using a 1 micrometer diamond slurry obtained under the trade designation "DIAMOND SPRAY" from Struers) to obtain a polished cross-section of the wire. A scanning electron microscope (SEM) photomicrograph was taken of the polished wire cross-section at 150×. When taking the SEM photomicrographs, the threshold level of the image was adjusted to have all fibers at zero intensity, to create a binary image. The SEM photomicrograph was analyzed with the NIH IMAGE software, and the fiber volume fraction obtained by dividing the mean intensity of the binary image by the maximum intensity. The accuracy of this method for determining the fiber volume fraction was believed to be +/−2%.

Specific examples of various composite metal matrix fabrications are described below, Example 1

The wire in this example follows the teaching and method processes disclosed in International Publication No. WO 97/00976. Twenty (20) tows of 1800 denier aluminoborosilicate fiber (available under the trade designation "NEXTEL 312" from the 3M Company) arranged in a band 12 mm (0.5 inch) wide were fed into a molten bath of 99.97% pure aluminum (obtained from Belmont Metals of New York, N.Y.) contained in an alumina crucible having dimensions of 24.1 cm×31.3 cm×31.8 cm (commercially available from Vesuvius McDaniel of Beaver Falls, Pa.). The temperature of the molten aluminum was approximately 720° C. Each fiber tow was pulled off a spool mounted on a creel that imparted 60 grams (g) of tension per tow and entered the molten aluminum through the melt surface. Upon entering the melt, the fiber tows were arranged in a band 1.2 cm in width. Metal infiltration of the fiber band was facilitated by application of ultrasonic vibration to at least a portion of the melt and fiber tows by means of an ultrasonic horn positioned less than 1.25 mm above the fiber band. The horn consisted of an alloy of 95% niobium and 5% molybdenum that was fashioned into a cylinder 12.7 cm in length and 2.5 cm in diameter. The cylinder was tuned to the desired vibration frequency of 20.0–20.4 kHz by altering its length. The amplitude of the actuator was approximately 0.002 cm. The horn was connected to a titanium waveguide which, in turn, was connected to the ultrasonic transducer (obtained from Sonics & Materials, Danbury Conn.). The fibers were infiltrated with matrix material and then pulled out through an exit die made of low purity aluminum oxide The die had an inside diameter of 1.98 mm. Wires made by this process had diameters of about 0.20 cm.

Figure 2:
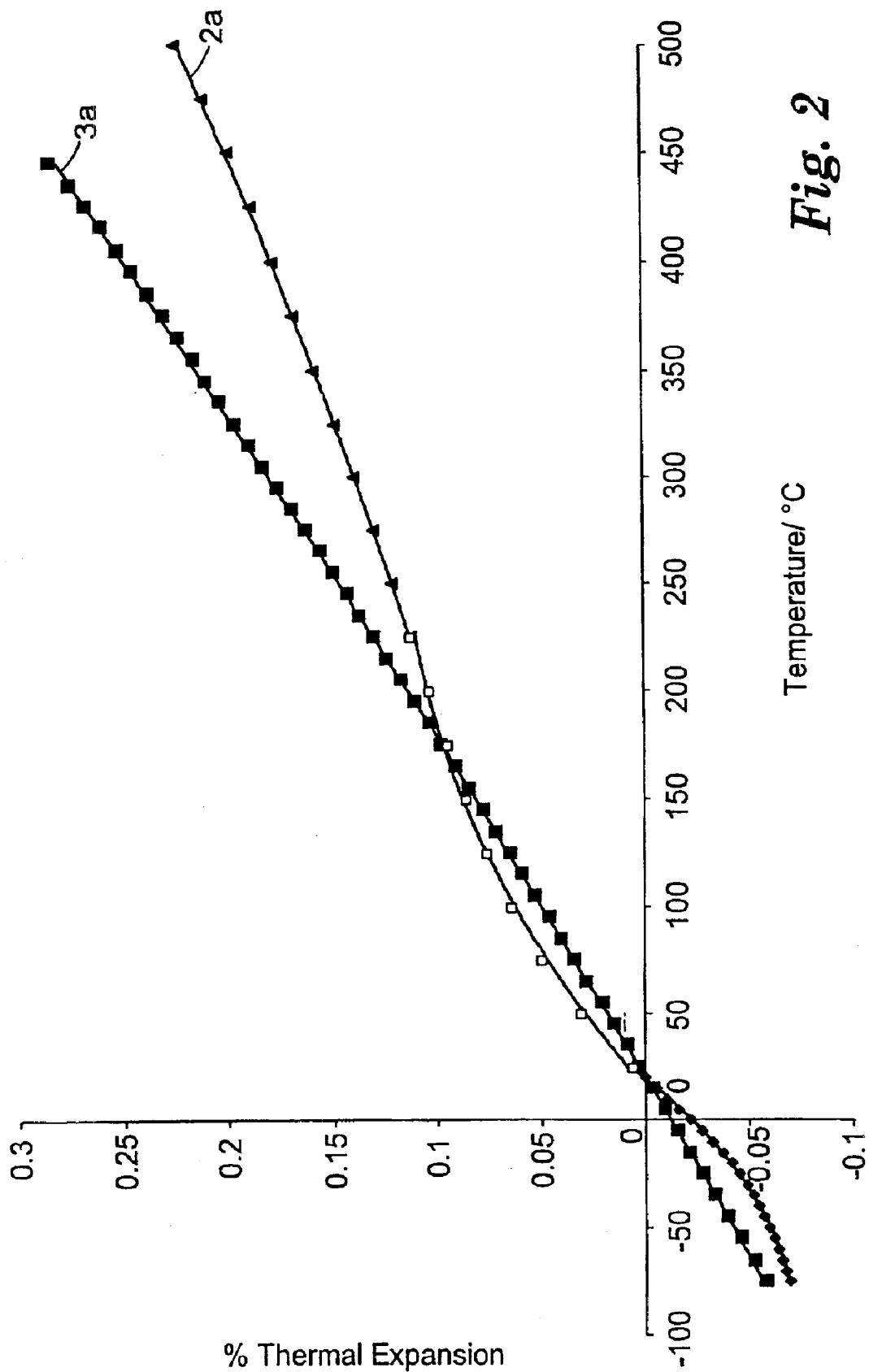
FIG. 2 is a curve fit to the percent expansion as a function of temperature curve for, the wire made from fibers marketed under the trade designation "NEXTEL 610" (line 3 of FIG. 1) and for wire made from fibers marketed under the trade designation "NEXTEL 312" (line 2 of FIG. 1) fibers of FIG. 1.

Curves (i.e., lines) 1 and 2 of FIG. 1 are plots of the thermal expansion vs. temperature data for two wire samples produced by this process over lo the temperature range of −75° C. (minus) to 500° C. The data may be sub-divided into three regions from which the CTE may be computed for each distinct region, as has been done for curve 2 of FIG. 1, the plot of which is shown as curve 2a in FIG. 2. $R^2$ is a statistical measure of the closeness of the curve fit. When $R^2=1$, the equation for the curve conforms exactly to the experimentally determined curve. For the region from −75° C. to 20° C., where the curve is defined by the equation:

$$y=(5.3918\times10^{-6})x^2+(1.0314\times10^{-3})x-2.2245\times10^{-2}$$

$$R^2=9.9930\times10^{-1}$$

the CTE increases linearly from 2.2 to 12.5. For the region (20° C. to 225° C.), where the curve is defined by the equation:

$$y=(1.6630\times10^{-6})x^2+(9.2031\times10^{-4})x-1.3358\times10^{-2}$$

$$R^2=9.9649\times10^{-1}$$

the CTE decreases linearly from 8.4 to 2.5. For region 225° C. to 500° C., where the curve is defined by the equation:

$$y = (1.2136 \times 10^{-7})x^2 + (6.0436 \times 10^{-4})x - 1.2290 \times 10^{-2}$$

$$R^2 = 9.9994 \times 10^{-1}$$

the CTE increases linearly from 3.3 to 4.7.

Figure 3:
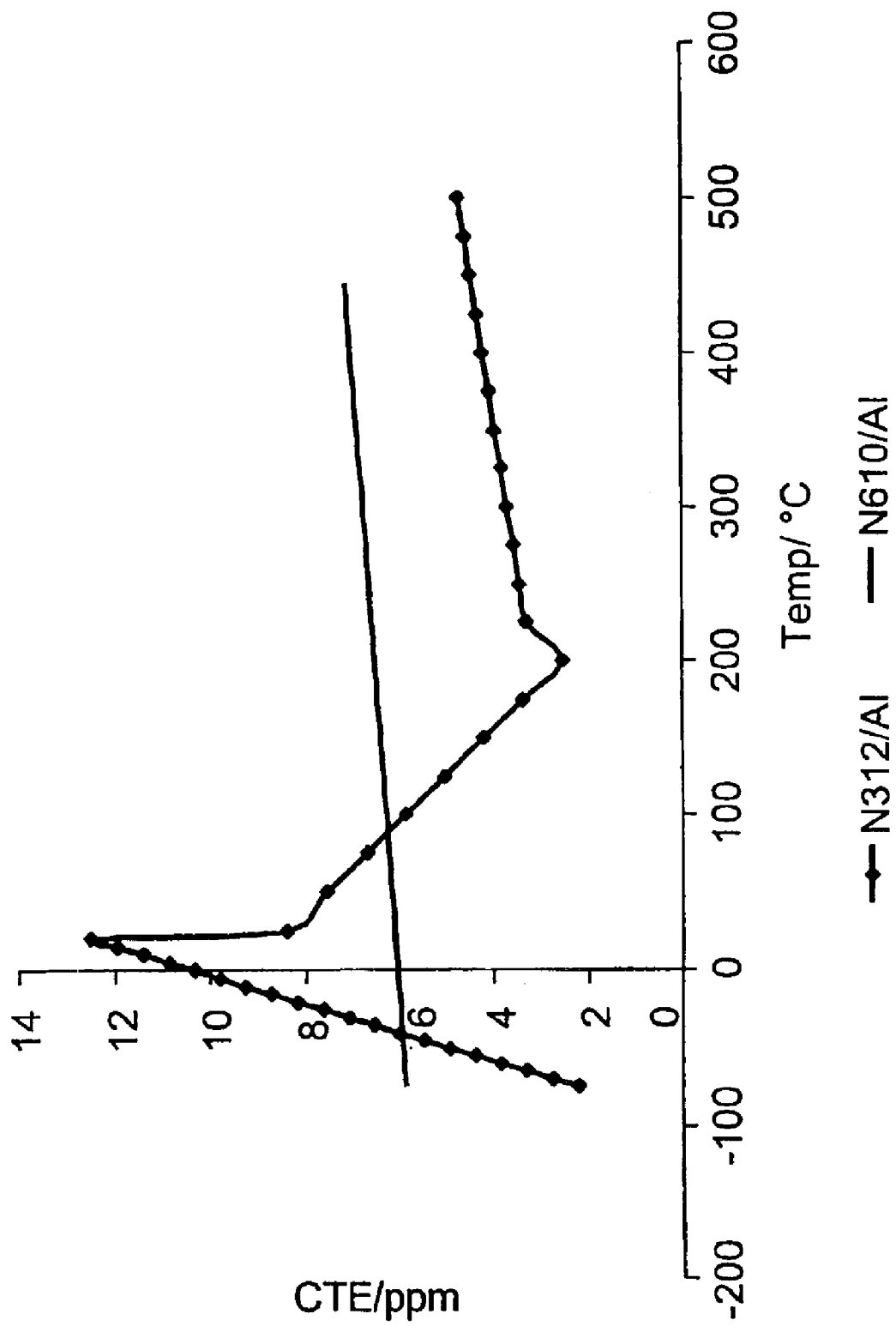
FIG. 3 is a plot of the instantaneous CTE derived from the curve fit of FIG. 2.

FIG. 3 is a plot of the derivatives of the three equations that define the CTE clearly illustrating the non-linear CTE behavior of the "NEXTEL 312" fiber reinforced wire. Thus over the entire temperature range of −75° C. (minus) to 500° C., the CTE is clearly non-linear. The discontinuities at 20–25° C. and 200–225° C. in FIG. 3 are artifacts of splitting the data into three sets and treating each region separately.

Tensile testing of 5 samples gave a range of tensile strength of 0.441–0.524 GPa (64–76 ksi), with an average of 0.486 GPa (71 ksi). The strain to failure ranged from 0.82% to 0.99% with an average of 0.88%, and the average tensile modulus was 74 GPa (10.7 Msi). The fiber volume fraction was 45.5%. The wire diameter was 0.0785 inches (1.99 mm). The fraction of the theoretical fiber strain to failure for this wire was calculated to be 80%.

Example 2

Wire was prepared substantially as described in Example 1 except that 10 tows of 1800 denier aluminoborosilicate fiber (available under the trade designation "NEXTEL 312" from the 3M Company) were used. Tensile testing of 5 samples gave a range of tensile strength of 0.317–0.441 GPa (46–64 ksi), with an average of 0.372 GPa (54 ksi). The strain to failure ranged from 0.90% to 1.24% with an average of 1.07%, and the average tensile modulus was 92 GPa (8.0 Msi). The fiber volume fraction was 28%. The wire diameter was 0.071 inches (1.80 mm). The fraction of the theoretical fiber strain to failure for this wire was calculated to be 97%.

Example 3

Wire was prepared substantially as described in Example 1 except that 22 tows of 1800 denier aluminoborosilicate fiber (available under the trade designation "NEXTEL 312" from the 3M Company) were used. Tensile testing of 5 samples gave a range of tensile strength of 0.482–0.622 GPa (70–93 ksi), with an average of 0.565 GPa (82 ksi). The strain to failure ranged from 0.80% to 0.99% with an average of 0.86%, and the average tensile modulus was 55 GPa (13.3 Msi). The fiber volume fraction was 49%. The wire diameter was 0.0794 inches (2.02 mm). The fraction of the theoretical fiber strain to failure for this wire was calculated to be 78%.

Example 4

Figure 4:
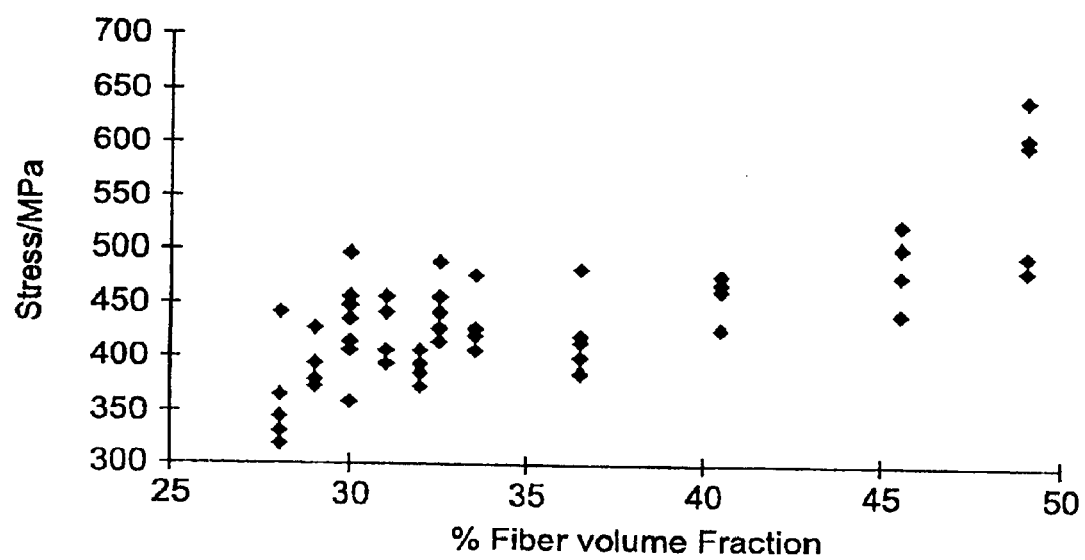
FIG. 4 is a graph of tensile strength vs. fiber volume fraction for wire made from fibers marketed under the trade designation "NEXTEL 312" and pure aluminum.
Figure 5:
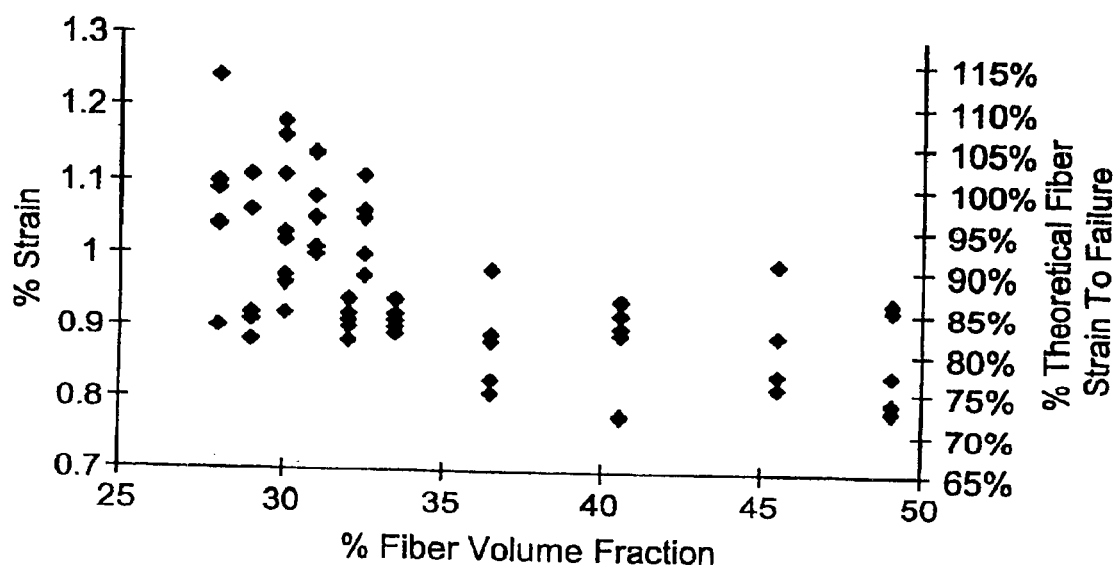
FIG. 5 is a graph of tensile strain to failure vs. fiber volume fraction for wire made from fibers marketed under the trade designation "NEXTEL 312" and pure aluminum. The fraction of the theoretical fiber strain to failure is shown as a second strain axis.
Figure 6:
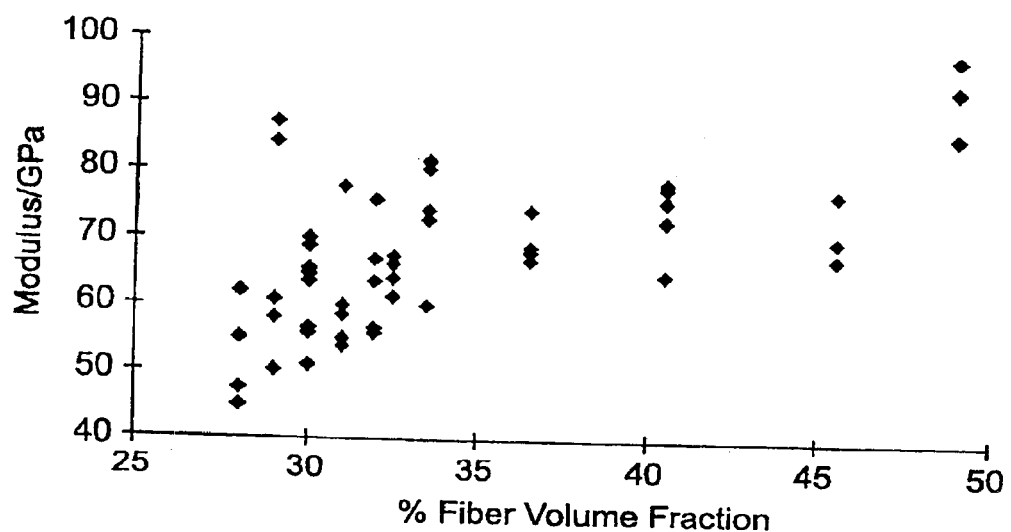
FIG. 6 is a graph of the tensile modulus vs. fiber volume fraction for wires made from fibers marketed under the trade designation "NEXTEL 312" and pure aluminum.

Wire samples were prepared substantially as described in Example 1 except that the number of fiber tows of 1800 denier aluminoborosilicate fiber (available under the trade designation "NEXTEL 312" from the 3M Company) was varied over the range of 10, 11, 12, 13, 14, 15, 16, 17, 18, 20 and 22 tows. Tensile testing of 5 samples of each wire sample was performed and the data points are plotted against fiber volume fraction in FIGS. 4, 5, and 6 for tensile strength, strain to failure and tensile modulus. FIG. 4 shows that stress increases as fiber volume fraction increases. FIG. 5 shows that strain decreases as fiber volume fraction increases. FIG. 6 shows that modulus increases as fiber volume fraction increases.

Example 5

Two cable cores were designed, both based on the properties of "NEXTEL 312" reinforced wires described in Example 1. The first design had an unstranded (i.e., longitudinally aligned wires) 6/1 configuration, with six outer wires closely grouped around a central wire, and the second design had a stranded 6/1 configuration, with six outer wires helically stranded around a central wire with a "lay factor" of 18. The "lay factor" of a stranded cable was determined by dividing the length of the stranded cable in which a single strand completed one helical revolution divided by the nominal outside diameter of the layer that includes that strand. The modulus of the stranded cable core was reduced by the helical lay to 95% of the modulus of the unstranded cable core in Example 1.

Several cable properties were calculated for the two constructions based on the properties of the properties of the "NEXTEL 312" fiber reinforced wires described in Example 1 utilizing the following equations:

Core diameter is defined by the equation:

$$D_c = 3 \times D_w$$

where $D_w$ is the diameter of the individual wires making up the core or 2.0 mm for the "NEXTEL 312" wires used in Example 5;

The total area of the core is defined by the equation:

$$A_c = N_w \times (\pi/4 \times D_w^2)$$

where $N_w$ is the number of wires used in the core, or 7 for the 6/1 core construction described in Example 5;

Core weight is defined by the equation:

$$W_c = A \times 12 \times (d_w \times F^e_c)$$

where $d_w$ is the density of the wire used to make the core, or 0.098 lb/in$^3$ (2.7 g/cc) for thee "NEXTEL 312" wires used in Example 5;

$F^e_c$ is the electrical rating factor for the core, or 0 for the unstranded core of Example 5;

$F^e_c$ is the electrical rating factor for the core, or 0.4% for the stranded core of Example 5;

Core break strength is defined by the equation:

$$S_c = (S_w \times F^m_c) \times A_c$$

where $S_w$ is the tensile strength of the wire used to make the core, or 0.490 GPa for the wire used in Example 5;

$F^m_c$ is the core mechanical rating factor, or 96% for core constructions of Example 5;

Core modulus is defined by the equation:

$$M_c = M_w \times F^S_c$$

where $M_w$ is the modulus of the wire used in the core, or 73.8 GPa for the wire used in Example 5;

$F^S_c$ is the core stranding factor, or 100% for the unstranded core of Example 5;

$F^S_c$ is tile core stranding factor, or 95.6% for the stranded core of Example 5;

Core resistance is defined by the equation:

$$R_c = [1/(C_w \times 1.228)/A] \times 5.28 \times (1 + F^e_c)$$

where
- $C_w$ is 31.7% IACS (International Annealed Copper Standard)

Cable diameter is defined by the equation:

$$D = 3 \times D_w + 4 \times D_a$$

where
- $D_w$ is the diameter of the wires used in the core, or 2.0 mm inches for the "NEXTEL 312" wire used in the cores of Example 6;
- $D_a$ is the diameter of the conductor wires used in the cable, or 0.1013 for the Al conductor wires used in the cables of Example 6;

The total area of the cable is defined by the equation:

$$A = N_w \times \pi/4 \times D_w^2 + N_a \times \pi/4 \times D_a^2$$

where
- $N_w$ is the number of wires in the core, or 7 for the 6/1 core constructions of the cables of Example 6;
- $N_a$ is the number of conductor wires, or 26 for the 26/7 cable constructions of Example 6;

The weight of the cable is defined by the equation:

$$W = f \times A \times 12 \times (d_w \times F^e_c) + (1-f) \times A \times 12 \times (d_a \times F^e_a)$$

where
- f is the area fraction of the core, or 0.14 for the 26/7 cable constructions of Example 6;
- $d_w$ is the density of the wire used in the core, or 0.098 lb/in³ (2.7 g/cc) for the "NEXTEL-312" wire used in the cores-of the sables of Example 6;
- $F^e_c$ is the electrical rating factor for the core, or 0.4% for the cores of the cables of Example 6;
- $d_a$ is the density of the conductor wires, or 0.097 lb/in³ (2.7 g/cc) for the Al wires used in the cables of Example 6;
- $F^e_a$ is the electrical rating factor for Al, or 2.5%

The breaking strength of the cable is defined by the equation:

$$S = (S_w \times F^m_c) \times f \times A + (S_a \times F^m_a) \times (1-f) \times A$$

where
- $S_w$ is the tensile strength of the wire used in the core, or 0.490 GPa for the "NEXTEL 312" wire used in the cores of the cables of Example 6;
- $S_a$ is the tensile strength of the conductor wires, or 0.179 GPa for the Al conductor wires used in the cables of Example 6;
- $F^m_c$ is the mechanical rating factor for the core, or 93% for the cables of Example 6;
- $F^m_a$ is the mechanical rating factor for the aluminum wires, or 93% for the Al wires used in the cables of Example 6;

The modulus of the cable is defined by the equation:

$$M = f \times M_c + (1-f) \times M_a$$

where
- $M_c = M_w \times F^S_c$, or the modulus of the stranded core, where
- $M_w$ is the modulus of the wire used in the core, or 10,700,000 psi for the for the "NEXTEL 312" wire used in the cores of Example 6;
- $M_a$ is the modulus of the Al wires, or 7,960,000 psi for the Al wires used in the cables of Example 6;
- $F^S_c$ is the core stranding factor, or 99.6% for the cores of the cables of Example 6;

The CTE of the cable is defined by the equation:

$$E = f \times (M_c/M) \times E_w + (1-f) \times (M_a/M) \times E_a$$

where
- $E_w$ is the CTE of the wire used in the core, or $4.7 \times 10^{-6}/°C$. for the "NEXTEL 312" wire used in the cores of Example 6;
- $E_a$ is the CTE of the conductor wires, or $23.0 \times 10^{-6}/°C$. for the Al conductors used in the cables of Example 6;

The electrical resistance of the cable is defined by the equation:

$$R = 1/(1/R_c + 1/R_a)$$

where
- $R_c = 1/(C_w \times 1.228)/(f \times A) \times 5.28 \times (1 + F^e_c)$, or the resistance of the stranded core;
- $R_a = 1/(C_a \times 1.228)/((1-f) \times A) \times 5.28 \times (1 + F^e_a)$, or the resistance of the stranded aluminum wires;
- $C_w$ is the conductivity of the wire used in the core, or 31.7% IACS for the "NEXTEL 312" wire used in the cores of Example 6;
- $C_a$ is the conductivity of the conductors, or 61.2% IACS for the conductivity of the Al wires of the cables of Example 6.

The calculated properties for the two cable designs are reported in Table 1.

TABLE 1

Calculated Cable Properties for Cable Designs

|  | Unstranded Cable Design | | Helically Stranded Cable Design | |
| --- | --- | --- | --- | --- |
| Individual Wire Diameter | 0.0788 in. | 2.00 mm | 0.0788 in. | 2.00 mm |
| Cable Diameter | 0.24 in. | 6.00 mm | 0.24 in. | 6.00 mm |
| X-Sectional Area of Cable | 0.0341 in.² | 22.00 mm² | 0.0341 in.² | 22.00 mm² |
| Cable Weight | 0.040 lbs./linear ft. | 0.060 kg/m | 0.040 lbs./linear ft. | 0.060 kg/m |
| Cable Break Strength | 2,324 lbs. | 10.3 kN | 2,324 lbs. | 10.3 kN |
| Cable Modulus | 10.7 Msi | 73.8 GPa | 10.2 Msi | 70.5 GPa |
| Resistance (dc @ 20° C.) | 3.996 Ohms/mile | 2.483 Ohms/km | 3.980 Ohms/mile | 2.4731 Ohms/km |

Example 6

An electrical power transmission cable was designed using a stranded core cable design similar to that of Example 5, except that the lay factor of the cable was 50.8, and the cable has two outer, helically stranded layers of round 1350 aluminum wires as conductors. The cable model was a 26/7 configuration, with seven "NEXTEL 312" fiber-reinforced wires helically stranded into a central core, a 10 wire helically stranded intermediate layer of aluminum conductors stranded over the core, and a 16 wire helically stranded outer layer of aluminum conductors stranded over the intermediate layer of conductors. The properties of aluminum used for the outer conductor wires are specified in ASTM B 230 Specification for Aluminum 1350-H19, Wire for Electrical Purposes. The aluminum wires had a 179 MPa (26 ksi) tensile strength and the final modulus for the stranded aluminum wires was 54.9 GPa (7.96 Msi). The calculated properties of the conductor model are reported in Table 2.

TABLE 2

Calculated Properties for 26/7 "NEXTEL 312" Core Conductor Design

| | | |
|---|---|---|
| "312" Core - Individual Wire Diameter | 0.0788 in. | 2.00 mm |
| Individual Al Conductor Diameter | 0.1013 in. | 2.57 mm |
| Core Diameter | 0.24 in. | 6.00 mm |
| Complete Cable Diameter | 0.642 in. | 16.30 mm |
| Al Conductor Area | 0.209 in.$^2$ | 135.14 mm$^2$ |
| Total Cable Area | 0.2436 in.$^2$ | 157.16 mm$^2$ |
| Total Cable Weight | 0.291 lbs/linear ft. | 0.434 kg/m |
| Core Breaking Strength | 2,326 lbs. | 10.3 kN |
| Al Conductor Breaking Strength | 5,065 lbs. | 22.5 kN |
| Total Cable Breaking Strength | 7,391 lbs. | 32.9 kN |
| Al Conductor Modulus | 8.3 Msi | 57.5 GPa |
| CTE Below Transition Temperature (150° C.) | 19.74 × 10$^{-6}$/° C. | 19.74 × 10$^{-6}$/° C. |
| CTE Above Transition Temperature (150° C.) | 4.70 × 10$^{-6}$/° C. | 4.70 × 10$^{-6}$/° C. |
| Resistance (dc @ 20° C.) | 0.3166 Ohms/mile | 0.1967 Ohms/km |
| Core Lay Ratio | 50.8 | 50.8 |
| Intermediate Al Conductor Layer Lay Ratio | 13.0 | 13.0 |
| Outer Al Conductor Layer Lay Ratio | 11.0 | 11.0 |

To verify the functionality of the conductor with the "NEXTEL 312" fiber reinforced core, the sag-tension performance of conductor was compared to the sag-tension performance of a conductor model based on a conventional ACSR (Aluminum Conductor Steel Reinforced) conductor model having the same geometry and dimensions as the "NEXTEL 312" core model by means of a computer program for predicting sag tension performance of electrical conductors used for overhead transmission lines. This software package is commercially available under the trade designation SAG 10 Software from Alcoa Conductor Accessories and Alcoa Conductor Products Company, Pittsburgh, Pa. The software uses conductor properties and stress-strain data for conventional ACSR constructions that are part of the conductor database supplied with the software plus input data consistent with the properties of experimental materials used in non-conventional cable models such as those reported in Table 2 for the "NEXTEL 312" fiber reinforced cable model. The software was used to perform calculations for various mechanical loading conditions and conductor operating temperatures. Properties for the "NEXTEL 312" fiber reinforced cable model and the ACSR cable model are reported in Table 3.

TABLE 3

Calculated Properties for Cable Designs

| | "NEXTEL 312" Core Design | | ACSR Core Design | |
|---|---|---|---|---|
| Al Conductor Area | 0.210 in.$^2$ | 135.189 mm$^2$ | 0.210 in.$^2$ | 135.189 mm$^2$ |
| Total Cable Area | 0.2436 in.$^2$ | 157.161 mm$^2$ | 0.2436 in.$^2$ | 157.161 mm$^2$ |
| Cable Diameter | 0.642 in. | 16.3 mm | 0.642 in. | 16.3 mm |
| Cable Weight | 0.291 lb./ft. | 0.433 kg/m | 0.367 lb./ft. | 0.546 kg/m |
| RTS | 7391 lb. | 32.9 kN | 11,300 lb. | 50.3 kN |

The software used experimentally obtained stress-strain and thermal elongation data that are part of the database included in the software. For bi-metal conductors consisting of a reinforcing core and outer aluminum conductors such as ACSR, there are separate stress strain and thermal expansion data for each material.

Figure 11:
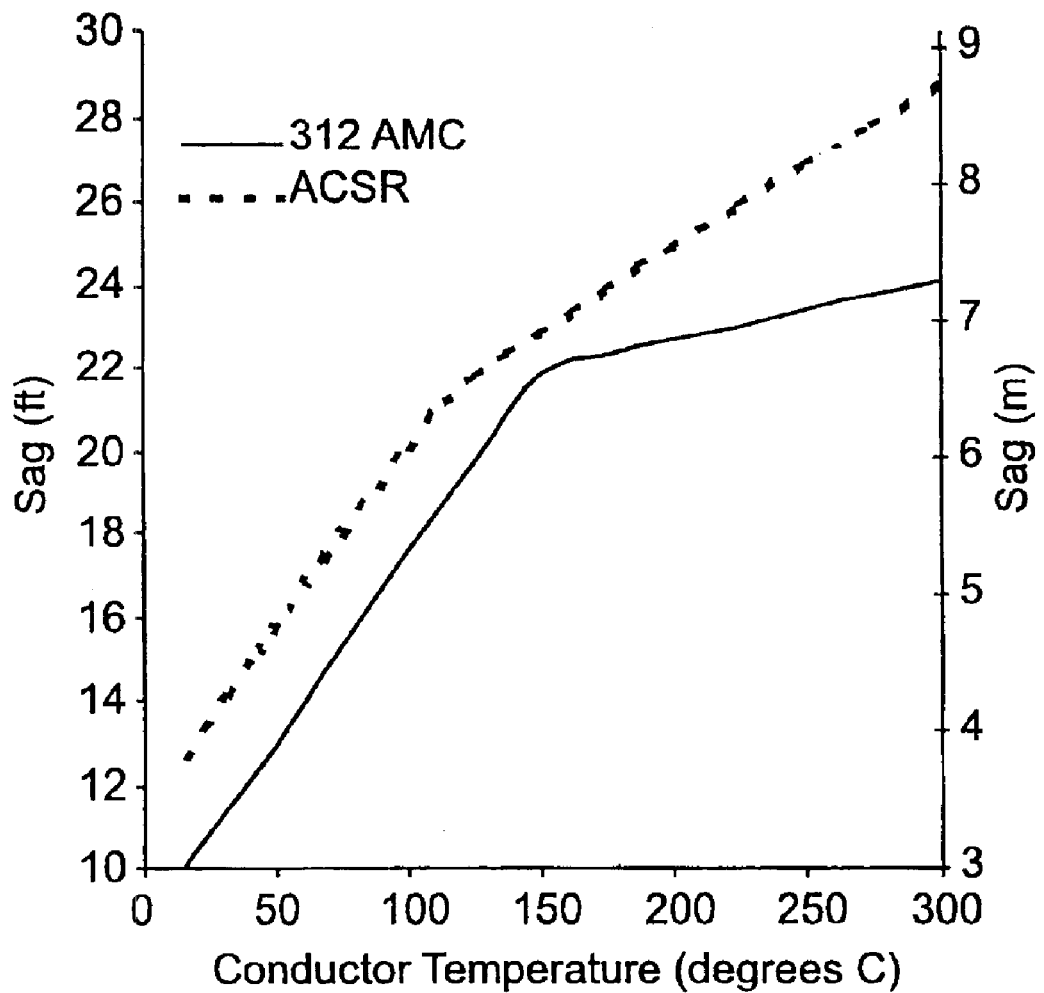
FIG. 11 is plot of sag versus conductor temperature of a cable according to the present invention.

Computer calculations were run for comparable installations of the two cable models utilizing a ruling span length of 738 ft. (225 m) and an initial installation tension of 1,980 lbs (8.8 kN). The calculated sag of the conductors at temperatures to 300° C. are graphically presented in FIG. 11. The "NEXTEL 312" core (curve 1 of FIG. 11) exhibited less sag than the ACSR core model over the entire temperature range. These results indicate that a "NEXTEL 312" core design can be used as an upgrade for conventional ACSR cable constructions. Since it has less sag than a similar design ACSR core conductor, the "NEXTEL 312" core can be operated at a higher temperature. It also transmits more current at higher temperatures than a similar design ACSR conductor without exceeding the sag of the ACSR conductor. The reduction in sag also allows for a reduction in tower height and costs when it is used on a new line.

Calculations were also made for the Sag and Tension behavior of the two cable models under heavy ice and wind loading conditions using the National Electric Safety Code Heavy Loading condition (0.5 Inch Ice, 4 lbs wind, K=0.3). Again the ruling span length was 738 ft. (225 m) and both cable designs are installed to the same initial tension of 1,980 lbs (8.8 kN). The results of these calculations, which are reported in Table 4, show that the tension on the "NEXTEL 312" core design is 12% lower that exhibited by the ACSR core model under maximum loading conditions. The reduced mechanical loads on towers provided by the "NEXTEL 312" core design can be translated to reduced tower costs and increased safety margins relative to standard ACSR conductor designs. Although the "NEXTEL 312" core design cable is not as strong as the steel cable, its maximum tension under heavy loading is well under its breaking strength and within recommended limits. It is surprising that a cable reinforced with a material of much lower strength than steel can exhibit markedly increased performance.

TABLE 4

Sag and Tension Calculations Under Maximum Load Conditions

| Cable Design | Sag | | Tension | | |
|---|---|---|---|---|---|
| | Feet | Meters | Pounds (lbs) | Kilonewtons (kN) | % Change |
| ACSR Design | 20.0 | 6.1 | 5,144 | 22.9 | — |
| "NEXTEL 312" Design | 21.7 | 6.6 | 4,538 | 20.2 | −12% |

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. An aluminum matrix composite wire comprising a plurality of substantially continuous, longitudinally positioned ceramic oxide fibers in a matrix comprising aluminum; wherein the ceramic oxide fibers have a modulus of no greater than about 173 GPa; and further wherein the wire has a modulus of no greater than about 105 Gpa and a nonlinear coefficient of thermal expansion over a temperature of −75° C. to 500° C.

2. The composite wire of claim 1 wherein the wire has an average tensile strength of at least about 350 MPa.

3. The composite wire of claim 1 wherein the fibers have a modulus of greater than about 69 GPa.

4. The composite wire of claim 1 wherein the fibers have an average tensile strength of at least about 1400 MPa.

5. The wire of claim 1 having an electrical conductivity of at least about 21% IACS.

6. A cable comprising at least one aluminum matrix composite wire comprising a plurality of substantially continuous, longitudinally positioned ceramic oxide fibers in a matrix comprising aluminum; wherein the fibers have a modulus of no greater than about 240 GPa; and further wherein the wire has a modulus of no greater than about 105 Gpa, an average tensile strength of at least about 350 Mpa, and a nonlinear coefficient of thermal expansion over a temperature of −75° C. to 500° C.

7. The cable of claim 6 wherein the fibers have a modulus of no greater than about 173 GPa.

8. The cable of claim 7 wherein the fibers have a modulus of greater than about 69 GPa.

9. The cable of claim 7 wherein the fibers have an average tensile strength of at least about 1400 MPa.

* * * * *

UNITED STATES PATENT AND TRADEMARK OFFICE
CERTIFICATE OF CORRECTION

PATENT NO. : 6,913,838 B2
APPLICATION NO. : 10/730182
DATED : July 5, 2005
INVENTOR(S) : McCullough, Colin It is certified that error appears in the above-identified patent and that said Letters Patent is hereby corrected as shown below:

On the title page, item [56]:

Page 2, Column 1
Line 11, delete "Oct," and insert thereof - - Oct. - -.

Page 2, Column 2
Line 8, delete "Gigerener" and insert in place thereof - - Gigerenzer - -.

Line 21, delete "of" and insert in place thereof - - on - -.

Line 24, after "Casting" delete "Kaise" and insert in place thereof - - Kaiser - -.

Line 32, before "SiC" delete "(".

Line 40, delete "Mechanical" and insert in place thereof - - Mechanical - -.

Line 61, after "Reaction", delete "of" and insert in place thereof - - on - -.

Line 62, delete "on" and insert in place thereof - - of - -.

Page 3, Column 1
Line 3, delete "Abstract" and insert in place thereof - - Abstracts - -.

Line 6, after "London" delete ",".

Column 1
Line 55, delete "Resinforced" and insert in place thereof - - Reinforced - -.

Column 2
Line 29, delete "a:plurality" and insert in place thereof - - a plurality - -.

Column 6
Line 63, delete "(ksi (MPa)" and insert in place thereof - - (ksi (MPa)) - -.

Column 7
Line 5, delete "(ksi (MPa)" and insert in place thereof - - (ksi (MPa)) - -.

Column 12
Line 34, after "wire" delete ",".

Line 49, delete "stain" and insert in place thereof - - strain - -.

UNITED STATES PATENT AND TRADEMARK OFFICE
CERTIFICATE OF CORRECTION

PATENT NO. : 6,913,838 B2
APPLICATION NO. : 10/730182
DATED : July 5, 2005
INVENTOR(S) : McCullough, Colin It is certified that error appears in the above-identified patent and that said Letters Patent is hereby corrected as shown below:

Column 14
Line 44, after "oxide" insert in place thereof - - . - -.

Line 49, after "over" delete "lo".

Column 16
Line 39, delete "thee" and insert in place thereof - - the - -.

Line 63, after "is" delete "tile" and insert in place thereof - - the - -.

Column 17
Line 32, delete "NEXTEL-312" and insert in place thereof - - NEXTEL 312 - -.

Line 33, delete "cores-of the sables" and insert in place thereof - - cores of the cables - -.

Column 18
Line 16, delete the second "for the" before "NEXTEL 312".

Column 18
Line 24, delete "$E=fx(M_c/M)xE_w)+(1-f)x(M_a/M)xEa$" and insert in place thereof
- - $E=fx(M_c/M)xE_w+(1-f)x(M_a/M)xEa$ - -.

Line 39, delete "$R_a=1/C_ax1.228)/(1-f)xA)x5.28x(1+F^e_a)$" and insert in place thereof
- - $R_a=1/(C_ax1.228)/(1-f)xAx5.28x(1+F^e_a)$ - -.

Signed and Sealed this

Twenty-second Day of August, 2006

JON W. DUDAS
*Director of the United States Patent and Trademark Office*